(12) United States Patent
Soga

(10) Patent No.: US 11,165,072 B2
(45) Date of Patent: Nov. 2, 2021

(54) CURABLE RESIN COMPOSITION, FUEL CELL USING SAME, AND SEALING METHOD USING SAME

(71) Applicant: THREEBOND CO., LTD., Hachioji (JP)

(72) Inventor: Tetsunori Soga, Tokyo (JP)

(73) Assignee: THREEBOND CO., LTD., Hachioji (JP)

(*) Notice: Subject to any disclaimer, the term of this patent is extended or adjusted under 35 U.S.C. 154(b) by 456 days.

(21) Appl. No.: 16/324,041

(22) PCT Filed: Jul. 21, 2017

(86) PCT No.: PCT/JP2017/026445
§ 371 (c)(1),
(2) Date: Feb. 7, 2019

(87) PCT Pub. No.: WO2018/047479
PCT Pub. Date: Mar. 15, 2018

(65) Prior Publication Data
US 2019/0214659 A1    Jul. 11, 2019

(30) Foreign Application Priority Data
Sep. 6, 2016  (JP) .............................. JP2016-174050

(51) Int. Cl.
*H01M 8/10* (2016.01)
*H01M 8/0286* (2016.01)
(Continued)

(52) U.S. Cl.
CPC ........... *H01M 8/0284* (2013.01); *B29C 65/48* (2013.01); *C08F 290/04* (2013.01);
(Continued)

(58) Field of Classification Search
CPC .... H01M 8/0284; H01M 8/02; H01M 8/0271; H01M 8/0286; H01M 8/10; B29C 65/48;
(Continued)

(56) References Cited

U.S. PATENT DOCUMENTS 5,171,760 A    12/1992  Kazas et al.
10,840,517 B2 * 11/2020  Soga ....................... H01M 8/10
(Continued)

FOREIGN PATENT DOCUMENTS

CN    101151343 A    3/2008
CN    101395749 A    3/2009
(Continued)

OTHER PUBLICATIONS

PCT/ISA/210, "International Search Report for International Application No. PCT/JP2017/026445," dated Oct. 10, 2017.
(Continued)

*Primary Examiner* — Alexander Usyatinsky
(74) *Attorney, Agent, or Firm* — Manabu Kanesaka (57) ABSTRACT

The present invention aims to provide a curable resin composition excellent in surface curability and deep curability by irradiation with active energy rays such as ultraviolet rays while maintaining sealability. The present invention provides a curable resin composition including the following ingredients (A) to (D): ingredient (A): a polymer which has one or more (meth)acryloyl groups and has a polyisobutylene backbone containing a —[CH2C(CH3)2]- unit, ingredient (B): a radical polymerization initiator, ingredient (C): a triarylphosphine or a triarylphosphine derivative, and ingredient (D): xanthone or a xanthone derivative.

18 Claims, 1 Drawing Sheet

(51) Int. Cl.
*H01M 8/0284* (2016.01)
*C09K 3/10* (2006.01)
*F16J 15/14* (2006.01)
*B29C 65/48* (2006.01)
*C08F 290/04* (2006.01)
*H01M 8/02* (2016.01)
*H01M 8/0271* (2016.01)

(52) U.S. Cl.
CPC ............ *C08F 290/042* (2013.01); *C09K 3/10* (2013.01); *F16J 15/14* (2013.01); *H01M 8/02* (2013.01); *H01M 8/0271* (2013.01); *H01M 8/0286* (2013.01); *H01M 8/10* (2013.01); *C09K 2003/1062* (2013.01); *Y02B 90/10* (2013.01)

(58) Field of Classification Search
CPC ...... C08F 290/04; C08F 290/042; C09K 3/10; C09K 2003/1062; F16J 15/14; Y02B 90/01
See application file for complete search history.

(56) References Cited

U.S. PATENT DOCUMENTS

| | | | |
|---|---|---|---|
| 2005/0043480 A1* | 2/2005 | Osawa | C08G 65/007 524/862 |
| 2006/0052546 A1* | 3/2006 | Morikawa | C08G 77/442 525/326.2 |
| 2006/0223903 A1 | 10/2006 | Cao et al. | |
| 2007/0066703 A1* | 3/2007 | Shinohara | B32B 27/08 522/172 |
| 2009/0004541 A1 | 1/2009 | Jacobine et al. | |
| 2009/0162715 A1 | 6/2009 | Burdzy | |
| 2009/0176953 A1 | 7/2009 | Morikawa et al. | |
| 2010/0013899 A1 | 1/2010 | Matsumura | |
| 2010/0155247 A1* | 6/2010 | Cao | C08L 23/22 204/600 |
| 2014/0190736 A1 | 7/2014 | Cao et al. | |
| 2014/0243444 A1* | 8/2014 | Ikari | C08F 8/00 522/28 |
| 2017/0051093 A1 | 2/2017 | Ikari et al. | |
| 2018/0219235 A1 | 8/2018 | Soga et al. | |

FOREIGN PATENT DOCUMENTS

| | | |
|---|---|---|
| CN | 101415769 A | 4/2009 |
| CN | 103827158 A | 5/2014 |
| EP | 3330304 A1 | 6/2018 |
| JP | S61-293204 A | 12/1986 |
| JP | H02-088614 A | 3/1990 |
| JP | H-3-004226 A | 1/1991 |
| JP | H04-183702 A | 6/1992 |
| JP | 2004-075824 A | 3/2004 |
| JP | 2004-111146 A | 4/2004 |
| JP | 2007-100099 A | 4/2007 |
| JP | 2009-531516 A | 9/2009 |
| JP | 2010-024295 A | 2/2010 |
| JP | 2011-124258 A | 6/2011 |
| JP | 2011-215375 A | 10/2011 |
| JP | 2013-216782 A | 10/2013 |
| JP | 2014-225456 A | 12/2014 |
| WO | 2013/047314 A1 | 4/2013 |
| WO | WO2013157624 * | 10/2013 |
| WO | 2017/18546 A1 | 2/2017 |

OTHER PUBLICATIONS

China Patent Office, "Office Action for Chinese Patent Application No. 201780050669.3," dated May 12, 2021.

Europe Patent Office, "Search Report for European Patent Application No. 17848424.2," dated Apr. 3, 2020.

* cited by examiner

CURABLE RESIN COMPOSITION, FUEL CELL USING SAME, AND SEALING METHOD USING SAME

RELATED APPLICATIONS

The present application is National Phase of International Application No. PCT/JP2017/026445 filed Jul. 21, 2017, and claims priority from Japanese Application No. 2016-174050, filed Sep. 6, 2016, the disclosure of which is hereby incorporated by reference herein in its entirety.

TECHNICAL FIELD

The present invention relates to a curable resin composition excellent in surface curability and deep curability by irradiation with active energy rays such as ultraviolet rays while maintaining sealability.

BACKGROUND ART

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and generates only water from the reaction of the hydrogen and the oxygen. There are four types of fuel cells, i.e., a solid polymer fuel cell, a phosphoric acid fuel cell, a molten carbonate fuel cell, and a solid oxide fuel cell. Among them, the solid polymer fuel cell achieves a high power generation efficiency even though its operating temperature is relatively low temperature (around 80° C.), and therefore is expected for usages such as power sources for automobiles, power generators for households, small power sources for electronic equipment such as mobile phones, and power sources for emergency.

Figure 1:
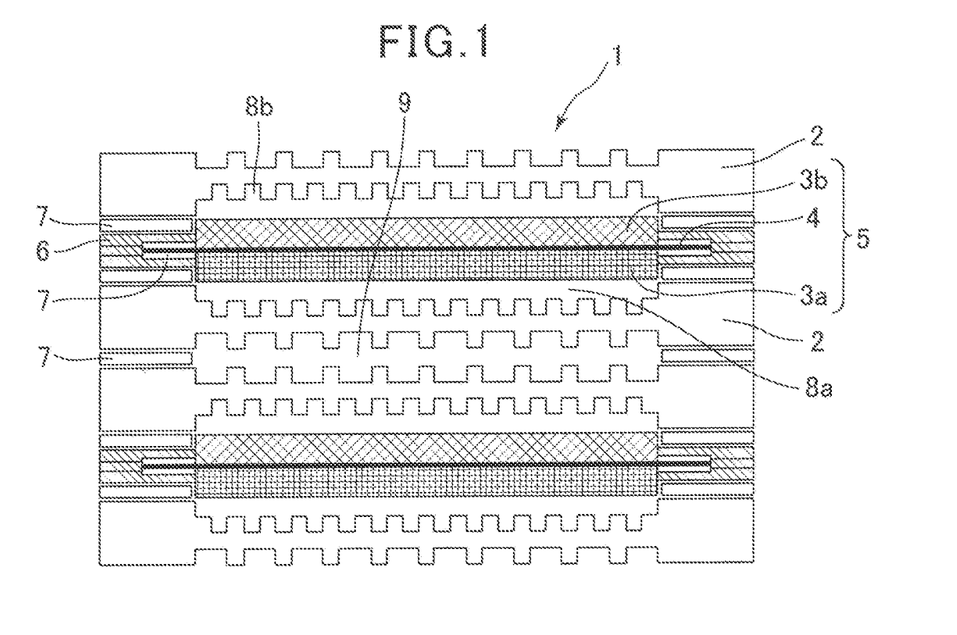
FIG. 1 is a schematic cross sectional view of a single cell of a fuel cell.

As illustrated in FIG. 1, a cell 1 of a solid polymer fuel cell has a structure including: an electrolyte membrane electrode assembly 5 (MEA) structured such that a polymer electrolyte membrane 4 is nipped between an air electrode 3a and a fuel electrode 3b; a frame 6 which supports the MEA; and separators 2 by which gas flow paths are formed.

In order to activate the solid polymer fuel cell, it is necessary to supply a fuel gas containing hydrogen to an anode electrode and supply an oxidation gas containing oxygen (oxygen gas) to a cathode electrode in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxidation gas, and so on. Specifically, the sealing agent is used between adjacent separators, between a separator and a frame, between a frame and an electrolyte membrane or MEA, and so on.

As to sealing agents for use in solid polymer fuel cells, studies have been made on: a thermosetting resin composition which uses a polyisobutylene-based polymer and causes a hydrosilylation reaction (see Patent Literature 1); a thermosetting resin composition which uses a fluoropolyether compound and causes a hydrosilylation reaction (see Patent Literature 2); a thermosetting resin composition which uses a fluoropolymer and causes a hydrosilylation reaction (see Patent Literature 3); and a thermosetting resin composition which uses an ethylene-propylene-diene rubber (see Patent Literature 4) as these compositions are rubber elastic bodies being excellent in gas permeation resistance, low moisture permeability, heat resistance, acid resistance, and flexibility. However, since the heat curable resin compositions of Patent Literatures 1 to 4 require a heating step for curing, there is a problem that process time is required and there is a risk of deterioration of the electrolyte membrane due to heating.

In view of the above, attention has been paid to a curable resin composition which achieves shortening of the process and is capable of preventing degradation of an electrolyte membrane due to heat. Patent Literatures 5 and 6 disclose photocurable sealing agents containing polyisobutylene diacrylate, a (meth)acrylic monomer, and a photoinitiator.

CITATION LIST

Patent Literatures

Patent Literature 1: Japanese Patent Application Publication No. 2004-111146

Patent Literature 2: Japanese Patent Application Publication No. 2004-075824

Patent Literature 3: Japanese Patent Application Publication No. 2007-100099

Patent Literature 4: Japanese Patent Application Publication No. 2011-124258

Patent Literature 5: Published Japanese Translation of PCT International Application No. 2009-531516

Patent Literature 6: Japanese Patent Application Publication No. Hei 2-88614

SUMMARY OF INVENTION

However, the photocurable resin compositions disclosed in Patent Literatures 5 and 6 are derived from polyisobutylene di(meth)acrylate and cause oxygen inhibition upon curing by irradiation with active energy rays. Therefore, the compositions are markedly inferior in surface curability and also in deep curability, and pose a problem in use as a sealing agent.

The present invention has been made in view of the above circumstances, and aims to provide a curable resin composition excellent in surface curability and deep curability by irradiation with active energy rays such as ultraviolet rays while maintaining sealability.

The present invention can have the following aspects.

[1]

A curable resin composition comprising the following ingredients (A) to (D):

ingredient (A): a polymer which has one or more (meth)acryloyl groups and has a polyisobutylene backbone containing a $-[CH_2C(CH_3)_2]-$ unit, ingredient (B): a radical polymerization initiator, ingredient (C): a triarylphosphine or a triarylphosphine derivative, and ingredient (D): xanthone or a xanthone derivative.

[2]

The curable resin composition according to [1] described above, wherein the ingredient (A) is a polymer having a polyisobutylene backbone represented by general formula (1):

(1)

where $R^1$ represents a monovalent or polyvalent aromatic hydrocarbon group, or a monovalent or polyvalent aliphatic hydrocarbon group, PIB represents the polyisobutylene backbone containing the —$[CH_2C(CH_3)_2]$— unit, $R^4$ represents a divalent hydrocarbon group having 2 to 6 carbon atoms and optionally containing an oxygen atom, $R^2$ and $R^3$ each independently represent a hydrogen atom or a monovalent hydrocarbon group having 1 to 20 carbon atoms, $R^5$ represents a hydrogen atom, a methyl group, or an ethyl group, and n is an integer from 1 to 6.

[3]

The curable resin composition according to [1] or [2] described above, further comprising a (meth)acrylate monomer as a ingredient (E).

[4]

The curable resin composition according to [3] described above, wherein the ingredient (E) is a (meth)acrylate monomer which has an alkyl group having 5 to 30 carbon atoms or an alicyclic group having 5 to 30 carbon atoms.

[5]

The curable resin composition according to any one of [1] to [4] described above, wherein the ingredient (C) is contained at 0.1 to 30 parts by mass and the ingredient (D) is contained at 0.1 to 30 parts by mass relative to 100 parts by mass of the ingredient (A).

[6]

A curable sealing agent for a fuel cell comprising the curable resin composition according to any one of [1] to [5] described above.

[7]

The curable sealing agent for a fuel cell according to [6] described above, wherein the curable sealing agent for a fuel cell is a sealing agent for a periphery of any member selected from the group consisting of separators, frames, electrolytes, fuel electrodes, air electrodes, and electrolyte membrane electrode assemblies, which are members in a fuel cell.

[8]

The curable sealing agent for a fuel cell according to [6] described above, wherein the sealing agent is a sealing agent between adjacent separators in a fuel cell or a sealing agent between a frame and an electrolyte membrane or an electrolyte membrane electrode assembly in the fuel cell.

[9]

The sealing agent according to any one of [6] to [8] described above, wherein the fuel cell is a solid polymer fuel cell.

[10]

A cured product which is formed by curing the curable resin composition according to any one of [1] to [5] described above or the sealing agent according to any one of [6] to [9] described above.

[11]

A fuel cell comprising any seal selected from the group consisting of seals between adjacent separators in the fuel cell and seals between a frame and an electrolyte membrane or an electrolyte membrane electrode assembly in the fuel cell, wherein the any seal contains the cured product according to [10] described above.

[12]

The fuel cell according to [11] described above, wherein the fuel cell is a solid polymer fuel cell.

[13]

A method for sealing at least part of at least two flanges of seal target components including the at least two flanges, at least one of which is a flange allowing active energy rays to pass therethrough, the method comprising the steps of: applying the curable resin composition according to any one of [1] to [5] described above to a surface of at least one of the flanges; sticking the one flange with the curable resin composition applied thereto onto the other flange with the curable resin composition interposed in between; and sealing the at least part of the at least two flanges by curing the curable resin composition by irradiation with active energy rays through the transmissive flange.

[14]

A method for sealing at least part of at least two flanges of seal target components including the at least two flanges, comprising the steps of: applying the curable resin composition according to any one of [1] to [5] described above to at least one of the flanges; irradiating the applied curable resin composition with active energy rays to cure the curable resin composition, thereby forming a gasket composed of a cured product of the curable resin composition; placing the other flange on the gasket, and sealing the at least part of the at least two flanges in such a way that the other flange and the one flange with the curable resin composition applied thereto are pressure bonded together with the gasket interposed in between.

[15]

A method for sealing at least part of at least two flanges of seal target components including the at least two flanges, comprising the steps of: placing a gasket formation mold on at least one of the flanges; injecting the curable resin composition according to any one of [1] to [5] described above into at least part of a cavity formed between the gasket formation mold and the flange on which the mold is placed; irradiating the curable resin composition with the active energy rays to cure the curable resin composition, thereby forming a gasket composed of a cured product of the curable resin composition; detaching the mold from the one flange; and sealing the at least part of the at least two flanges by placing the other flange on the gasket and then pressure bonding the one and the other flanges together with the gasket interposed in between.

Also, the present invention can have the following aspects.

[1b]

A photocurable resin composition comprising the following ingredients (A) to (D):

ingredient (A): a polymer which has one or more (meth)acryloyl groups and has a polyisobutylene backbone containing a —$[CH_2C(CH_3)_2]$— unit, ingredient (B): a photo-radical polymerization initiator, ingredient (C): a triarylphosphine or a triarylphosphine derivative, and ingredient (D): xanthone or a xanthone derivative.

[2b]

The photocurable resin composition according to [1b], wherein the ingredient (A) is a polymer having a polyisobutylene backbone represented by general formula (1).

[3b]
The photocurable resin composition according to [1b] or [2b], further comprising a (meth)acrylate monomer as a ingredient (E).

[4b]
The photocurable resin composition according to [3b], wherein the ingredient (E) is a (meth)acrylate monomer which has an alkyl group having 5 to 30 carbon atoms or an alicyclic group having 5 to 30 carbon atoms.

[5b]
The photocurable resin composition according to any one of [1b] to [4b], wherein the ingredient (C) is contained at 0.1 to 30 parts by mass and the ingredient (D) is contained at 0.1 to 30 parts by mass relative to 100 parts by mass of the ingredient (A).

[6b]
A fuel cell photocurable sealing agent comprising the photocurable resin composition according to any one of [1b] to [5b].

[7b]
The photocurable sealing agent for a fuel cell according to [6b], wherein the photocurable sealing agent for a fuel cell is a sealing agent for a periphery of any member selected from the group consisting of separators, frames, electrolytes, fuel electrodes, air electrodes, and electrolyte membrane electrode assemblies, which are members in a fuel cell.

[8b]
The photocurable sealing agent for a fuel cell according to [6b], wherein the sealing agent is a sealing agent between adjacent separators in a fuel cell or a sealing agent between a frame and an electrolyte membrane or an electrolyte membrane electrode assembly in the fuel cell.

[9b]
The sealing agent according to any one of [6b] to [8b], wherein the fuel cell is a solid polymer fuel cell.

[10b]
A cured product which is formed by photocuring the photocurable resin composition according to any one of [1b] to [5b] or the sealing agent according to any one of [6b] to [9b].

[11b]
A fuel cell comprising any seal selected from the group consisting of seals between adjacent separators in the fuel cell and seals between a frame and an electrolyte membrane or an electrolyte membrane electrode assembly in the fuel cell, wherein the any seal contains the cured product according to [10b].

[12b]
The fuel cell according to [11b], wherein the fuel cell is a solid polymer fuel cell.

[13b]
A method for sealing at least part of at least two flanges of seal target components including the at least two flanges, at least one of which is a flange allowing light of active energy rays to pass therethrough, the method comprising the steps of: applying the photocurable resin composition according to any one of [1b] to [5b] to a surface of at least one of the flanges; sticking the one flange with the photocurable resin composition applied thereto onto the other flange with the photocurable resin composition interposed in between; and sealing the at least part of the at least two flanges by curing the photocurable resin composition by irradiation with active energy rays through the fight-transmissive flange.

[14b]
A method for sealing at least part of at least two flanges of seal target components including the at least two flanges, comprising the steps of: applying the photocurable resin composition according to any one of [1b] to [5b] to at least one of the flanges; irradiating the applied photocurable resin composition with active energy rays to cure the photocurable resin composition, thereby forming a gasket composed of a cured product of the photocurable resin composition; placing the other flange on the gasket, and sealing the at least part of the at least two flanges in such a way that the other flange and the one flange with the photocurable resin composition applied thereto are pressure bonded together with the gasket interposed in between.

[15b]
A method for sealing at least part of at least two flanges of seal target components including the at least two flanges, comprising the steps of: placing a gasket formation mold on at least one of the flanges; injecting the photocurable resin composition according to any one of [1b] to [5b] into at least part of a cavity formed between the gasket formation mold and the flange on which the mold is placed; irradiating the photocurable resin composition with the active energy rays to cure the photocurable resin composition, thereby forming a gasket composed of a cured product of the photocurable resin composition; detaching the mold from the one flange; and sealing the at least part of the at least two flanges by placing the other flange on the gasket and then pressure bonding the one and the other flanges together with the gasket interposed in between.

The present invention provides a photocurable resin composition excellent in surface curability and deep curability by irradiation with active energy rays such as ultraviolet rays while maintaining sealability.

DESCRIPTION OF EMBODIMENTS

The details of the invention are described below.
<Ingredient (A)>
A ingredient (A) used in the present invention is not particularly limited as long as it is a polymer which has one or more (meth)acryloyl groups and has a polyisobutylene backbone containing a —[CH$_2$C(CH$_3$)$_2$]— unit. The ingredient (A) may have, for example, a —[CH$_2$C(CH$_3$)$_2$]— unit (polyisobutylene backbone), or may be a "constituent unit other than the —[CH$_2$C(CH$_3$)$_2$]— unit." The ingredient (A) suitably contains the —[CH$_2$C(CH$_3$)$_2$]— unit in an amount of, for example, 70% by mass or more, preferably 75% by mass or more, and more preferably 80% by mass or more relative to the total amount of the constituent units. In addition, the ingredient (A) suitably contains the —[CH$_2$C(CH$_3$)$_2$]— unit in an amount of, for example, 100% by mass or less, 95% by mass or less in another aspect, and 90% by mass or less in still another aspect. It is suitable that the ingredient (A) contains preferably 1 to 6, more preferably 2 to 4, further preferably 2 to 3, and particularly preferably 2 (meth)acryloyl groups. Note that, though not bound by theory, polymers in the present invention can be defined as a compound which has, for example, repeating units of monomers on the polymer main chain and which is composed of 100 or more repeating units.

The ingredient (A) is preferably a polymer which has a polyisobutylene backbone represented by general formula (1) from the viewpoint of excellence in active energy ray curability and adhesion to an electrolyte membrane. Specific examples of the ingredient (A) include polyisobutylene polymers having (meth)acryloyloxy alkoxyphenyl groups. Note that, although the main backbone of the ingredient (A) in the present invention is a polyisobutylene backbone, the monomers constituting this polyisobutylene backbone may include other monomers for copolymerization in addition to the mainly used isobutylene as long as the effects of the present invention are not impaired. Note that the ingredient (A) is preferably in a liquid state at normal temperature (25° C.±10° C.) because of excellent application workability of the curable resin composition.

In formula (1), $R^1$ represents a monovalent or polyvalent aromatic hydrocarbon group, or a monovalent or polyvalent aliphatic hydrocarbon group, preferably a polyvalent aromatic hydrocarbon group, and particularly preferably a divalent phenylene group. The group other than $R^1$ in formula (1) which is bonded to $R^1$ may be bonded at any of the ortho-, meta-, or para-positions if n=2, but is preferably bonded at para-position. PIB represents a polyisobutylene backbone containing the —[$CH_2C(CH_3)_2$]— unit (or composed of the —[$CH_2C(CH_3)_2$]— unit). $R^4$ represents a divalent hydrocarbon group having 2 to 6 carbon atoms and optionally containing an oxygen atom, and is preferably a divalent hydrocarbon group having 2 or 3 carbon atoms. $R^2$ and $R^3$ each independently represent a hydrogen atom or a monovalent hydrocarbon group having 1 to 20 carbon atoms, and preferably a hydrogen atom. $R^5$ represents a hydrogen atom, a methyl group, or an ethyl group, and preferably a hydrogen atom or a methyl group. Finally, n is an integer from 1 to 6, and particularly preferably an integer from 2 to 4.

For example, the molecular weight of the ingredient (A) of the present invention is, though not particularly limited, preferably 200 to 500,000, further preferably 1,000 to 100,000, and particularly preferably 3,000 to 50,000 in terms of number average molecular weight by chromatography measurement from the viewpoint of e.g. fluidity and physical properties after curing. Note that, unless otherwise specified, number average molecular weight was calculated by a standard polystyrene conversion method using size permeation chromatography (SEC).

The viscosity at 25° C. of the ingredient (A) in the present invention is not particularly limited, but is, for example, 5 Pa·s or more, preferably 50 Pa·s or more, and more prefer- ably 100 Pa·s or more and is, for example, 3000 Pa·s or less, preferably 2500 Pa·s or less, and more preferably 2000 Pa·s or less from the viewpoint of workability and the like. A particularly preferable viscosity is 1550 Pa s. Note that, unless otherwise specified, the viscosity was measured at 25° C. using a cone-plate type viscometer.

A method of producing the ingredient (A) is not particularly limited, and a known method can be used. Examples of the method include a method of obtaining the ingredient (A) by reacting a terminal hydroxyl group polyisobutylene polymer with acryloyl chloride or methacryloyl chloride, which is disclosed in Polymer Bulletin, Volume 6, pp. 135 to 141 (1981), T. P. Liao and J. P. Kennedy and Polymer Bulletin, Volume 20, pp. 253 to 260 (1988), Puskas et al. In addition, other examples of the method of producing the ingredient (A) include a method of obtaining ingredient (A) by reacting a terminal hydroxyl group polyisobutylene polymer, a (meth)acryloyl group, and a compound having an isocyanate group, a method of obtaining ingredient (A) by reacting a terminal hydroxyl group polyisobutylene polymer, a compound having an isocyanate group, and a compound having a hydroxyl group, a method of obtaining the ingredient (A) by reacting a terminal hydroxyl group polyisobutylene polymer and a (meth)acrylic acid or a (meth)acrylic acid lower ester by use of the dehydration esterification method or the transesterification method, and the like.

In addition, the method of producing the polyisobutylene polymer represented by general formula (1) described above is not particularly limited, and is preferably a method of reacting a halogen-terminated polyisobutylene polymer with a compound having a (meth)acryloyl group and a phenoxy group as represented by the following general formula (2), which is disclosed in Japanese Patent Application Publication No. 2013-216782. Additionally, the halogen-terminated polyisobutylene polymer is obtained by a known method, for example, obtained by cationic polymerization and more preferably obtained by living cationic polymerization.

In formula (2), $R^2$, $R^3$, $R^4$, and $R^5$ may be as defined in formula (1) described above. Specifically, $R^4$ represents a divalent hydrocarbon group having 2 to 6 carbon atoms and optionally containing an oxygen atom. $R^2$ and $R^3$ each independently represent a hydrogen atom or a monovalent hydrocarbon group having 1 to 20 carbon atoms. $R^5$ represents a hydrogen atom, a methyl group, or an ethyl group. Examples of the compound represented by formula (2) described above include phenoxyethyl acrylate, phenoxyethyl acrylate, and phenoxypropyl acrylate. Phenoxyethyl acrylate is preferable.

<Ingredient (B)>

A ingredient (B) used in the present invention, namely a radical polymerization initiator, is not limited as long as it is a compound which generates a radical or the like that cures the ingredient (A) of the present invention by irradiation with active energy rays. Here, the active energy rays include all light in a broad sense, for example radiation such as α-rays and β-rays, electromagnetic waves such as γ-rays and X-rays, electron beams (EB), ultraviolet rays having a wavelength of about 100 to 400 nm, and visible light rays having a wavelength of about 400 to 800 nm. Ultraviolet rays are preferable. Examples of the ingredient (B) include acetophenone-based radical polymerization initiators, benzoin-based radical polymerization initiators, benzophenone-based radical polymerization initiators, thioxanthone-based radical polymerization initiators, acylphosphine oxide-based radical polymerization initiators, and titanocene-based radical polymerization initiators. Among these, the acetophenone-based radical polymerization initiators and the acylphosphine oxide-based radical polymerization initiators are preferable from the viewpoint that it is possible to obtain a cured product excellent in surface curability and deep curability by irradiation with active energy rays. Additionally, these may be used singly or in combination of two or more kinds.

Examples of the acetophenone-based radical polymerization initiators include, but not limited to, diethoxyacetophenone, 2-hydroxy-2-methyl-1-phenyl-propan-1-one, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino(4-thiomethylphenyl)propan-1-one, 2-benzyl-2-dimethylamino-1-(4-morpholinophenyl)butanone, and 2-hydroxy-2-methyl-1-[4-(1-methylvinyl)phenyl]propanone oligomer. Examples of the commercially available products of the acetophenone-based radical polymerization initiators include IRGACURE 184, IRGACURE 1173, IRGACURE 2959, IRGACURE 127 (manufactured by BASF), and ESACURE KIP-150 (manufactured by Lamberti s. p. a.).

Examples of the acylphosphine oxide-based radical polymerization initiators include, but not limited to, bis(2,4,6-trimethylbenzoyl)-phenyl-phosphine oxide and 2,4,6-trimethylbenzoyl-diphenyl-phosphine oxide. Examples of the commercially available products of the acylphosphine oxide-based radical polymerization initiators include IRGACURE TPO, IRGACURE 819, and IRGACURE 819 DW (manufactured by BASF).

The amount of the ingredient (B) of the present invention blended is, but not particularly limited to, preferably 0.1 to 30 parts by mass, further preferably 0.5 to 20 parts by mass, and particularly preferably 1 to 15 parts by mass relative to 100 parts by mass of the ingredient (A) from the viewpoint that it is possible to achieve both surface curability and deep curability.

<Ingredient (C)>

A ingredient (C) of the present invention is not particularly limited as long as it is a triarylphosphine or a triarylphosphine derivative. The ingredient (C) of the present invention can be used as a sensitizer in a curing reaction by active energy rays. When combined with other ingredients of the present invention, it is possible to achieve surface curability and deep curability by irradiation with active energy rays such as ultraviolet rays. In particular, the ingredient (C) has significant effects when used in combination with the ingredient (D) to be described later.

Here, examples of the aryl groups in the triarylphosphine or the triarylphosphine derivative include phenyl groups, benzyl groups, (o-, m-, p-)tolyl groups, and (o-, m-, p-)xylyl groups. Examples of the triarylphosphine derivative include tris(o-tolyl)phosphine, tris(p-tolyl)phosphine, and tris(m-tolyl)phosphine. The ingredient (C) of the present invention is particularly preferably triphenylphosphine. In addition, these may be used singly or in combination of two or more kinds.

The amount of the ingredient (C) of the present invention blended is not particularly limited, but preferably 0.1 to 30 parts by mass, further preferably 0.5 to 20 parts by mass, and particularly preferably 1 to 15 parts by mass relative to 100 parts by mass of the ingredient (A) from the viewpoint that it is possible to achieve both surface curability and deep curability.

The mass ratio of the ingredient (B) and the ingredient (C) ((B):(C)) is, for example, 8:1 to 1:8, preferably 5:1 to 1:5, further preferably 4:1 to 1:4, and particularly preferably 3:1 to 1:3. The above ranges make it possible to achieve both surface curability and deep curability.

<Ingredient (D)>

A ingredient (D) of the present invention is not particularly limited as long as it is xanthone or a xanthone derivative. The ingredient (D) of the present invention can be used as a sensitizer in a curing reaction by active energy rays. When combined with other ingredients of the present invention, it is possible to achieve surface curability and deep curability by irradiation with active energy rays such as ultraviolet rays. In particular, the ingredient (D) has significant effects when used in combination with the ingredient (C) described above.

Examples of the xanthone derivative of the ingredient (D) include 3-hydroxyxanthone and diethoxyxanthone. The ingredient (D) of the present invention is particularly preferably xanthone. These may be used singly or in combination of two or more kinds.

The amount of the ingredient (D) of the present invention blended is not particularly limited, but preferably 0.1 to 30 parts by mass, further preferably 0.5 to 20 parts by mass, and particularly preferably 1 to 15 parts by mass relative to 100 parts by mass of the ingredient (A) from the viewpoint that it is possible to achieve both surface curability and deep curability.

The mass ratio of the ingredient (B) and the ingredient (D) ((B):(D)) is preferably 5:1 to 1:5, further preferably 4:1 to 1:4, and particularly preferably 3:1 to 1:3. The above ranges make it possible to achieve both surface curability and deep curability.

The mass ratio of the ingredient (C) and the ingredient (D) ((C):(D)) is preferably 5:1 to 1:5, further preferably 4:1 to 1:4, and particularly preferably 3:1 to 1:3. The above ranges make it possible to provide significant effects as a sensitizer in a curing reaction by active energy rays, in particular as a sensitizer in a curing reaction by the radical polymerization initiator which is the ingredient (B) of the present invention.

<Ingredient (E)>

A ingredient (E) of the present invention, a (meth)acrylate monomer, is a compound which is polymerized by radical species generated by the ingredient (B) of the present invention, and is used as a reactive diluent. Note that the ingredient (A) of the present invention is excluded. Examples of the ingredient (E) usable include monofunctional, bifunctional, trifunctional, and polyfunctional monomers. Among these, (meth)acrylate monomers which have alkyl groups having 5 to 30 carbon atoms or alicyclic groups having 5 to 30 carbon atoms are preferable from the viewpoint of excellent curability and compatibility with the ingredient (A) of the present invention. Here, the number of carbon atoms above is, for example, two or more, preferably 3 or more, more preferably 5 or more, and further preferably 7 or more as well as, for example, 30 or less, preferably 20 or less, more preferably 15 or less, and further preferably 10 or less.

Examples of the (meth)acrylate monomers which have alkyl groups having 5 to 30 carbon atoms include, but not particularly limited to, 2-ethylhexyl (meth)acrylate, octyl (meth)acrylate, isooctyl (meth)acrylate, decyl (meth)acrylate, dodecyl (meth)acrylate, isodecyl (meth)acrylate, lauryl (meth)acrylate, n-octadecyl (meth)acrylate, isooctadecyl (meth)acrylate, nonadecane (meth)acrylate, 3-heptyldecyl-1-(meth)acrylate, and stearyl (meth)acrylate. In addition, examples of the (meth)acrylate monomers which have alicyclic groups having 5 to 30 carbon atoms include cyclohexyl (meth)acrylate, dicyclopentanyl (meth)acrylate, dicyclopentenyl (meth)acrylate, dicyclopentenyloxy (meth) acrylate, isobornyl (meth)acrylate, adamantyl (meth) acrylate, dicyclopententenyl di(meth)acrylate, and the like. The ingredient (E) may be used singly or as a mixture of two or more kinds.

The amount of this ingredient (E) blended is preferably 3 to 300 parts by mass, more preferably 5 to 200 parts by mass, and particularly preferably 10 to 100 parts by mass relative to 100 parts by mass of the ingredient (A). The above ranges are preferable because there is no possibility that the surface curability is deteriorated if the amount of the ingredient (E) is 3 parts by mass or more, and the moisture permeability of the curable resin composition does not decrease if the ingredient (E) is 300 parts by mass or less.

<Optional Ingredient>

It is possible to use additives in the composition of the present invention, such as oligomers having (meth)acryloyl groups (not containing the ingredient (A) and the ingredient (E) of the present invention), thermal radical initiators, polythiol compounds, tertiary amine compounds, various kinds of elastomers such as styrene-based copolymers, fillers, preservation stabilizers, antioxidants, light stabilizers, adhesion promoters, plasticizers, pigments, flame retardants, and surfactants as long as the object of the present invention is not impaired.

Examples of the oligomers having (meth)acryloyl groups (not containing the ingredient (A) and the ingredient (E) of the present invention) include, but not particularly limited to, urethane (meth)acrylates having a polybutadiene backbone, urethane (meth)acrylates having a hydrogenated polybutadiene backbone, urethane (meth)acrylates having a polycarbonate backbone, urethane (meth)acrylates having a polyether backbone, urethane (meth)acrylates having a polyester backbone, urethane (meth)acrylates having a castor oil backbone, isoprene-based (meth)acrylates, hydrogenated isoprene-based (meth)acrylates, epoxy (meth)acrylates, and (meth)acryl group-containing acrylic polymers. Particularly preferable are the urethane (meth)acrylates having a polybutadiene backbone, the urethane (meth)acrylates having a hydrogenated polybutadiene backbone, the urethane (meth) acrylates having a castor oil backbone, the isoprene-based (meth)acrylates, and the hydrogenated isoprene-based (meth)acrylates from the viewpoint of excellent compatibility with the ingredient (A) and the ingredient (E) of the present invention. Note that in the present invention, oligomers refer to compounds which have repeating units of monomers on the main chain and are composed of 2 to 100 repeating units.

Examples of the thermal radical initiator include, but not particularly limited to, ketone peroxides, peroxyketals, dialkyl peroxides, hydroperoxides, peroxyesters, diacyl peroxides, and peroxydicarbonate. These compounds may be used singly or mixed in combination of two or more kinds.

Examples of the polythiol compounds include, but not particularly limited to, trimethylolpropane tris(3-mercaptopropionate), pentaerythritol tetrakis(3-mercaptopropionate), trimethylolpropane tris(3-mercaptobutyrate), trimethylolethane tris(3-mercaptobutyrate), trimethylolethane tris(3-mercaptobutyrate), ethylene glycol bis(3-mercaptoglycolate), butanediol bis(3-mercaptoglycolate), trimethylol propane tris(3-mercaptoglycolate), pentaerythritol tetrakis (3-mercaptoglycolate), tris-[(3-mercaptopropionyloxy)-ethyl]-isocyanurate, pentaerythritol tetrakis(3-mercaptopropionate), tetraethylene glycol bis(3-mercaptopropionate), dipentaerythritol hexakis(3-mercaptopropionate), pentaerythritol tetrakis(3-mercaptobutyrate), 1,4-bis(3-mercaptobutyryloxy)butane, and 1,3,5-tris(3-mercaptobutyloxyethyl)-1,3,5-triazin-2,4,6(1H, 3H, 5h)-trione. These compounds may be used singly or mixed in combination of two or more kinds.

Examples of the commercially available products of the polythiol compounds include, but not limited to, TMTP and PETP (manufactured by Yodo Kagaku Co., Ltd.), TEMPIC, TMMP, PEMP, PEMP-II-20P, and DPMP (manufactured by SC Organic Chemical Co., Ltd.), and MTNR 1, MTBD 1, and MTPE 1 (manufactured by Showa Denko KK). These compounds may be used singly or mixed in combination of two or more kinds.

The present invention may be blended with tertiary amine compounds for the purpose of improving curability. Examples of the tertiary amine compounds include, but not particularly limited to, trimethylamine, triethylamine, tributylamine, N,N'-diethanolamine, N,N'-dimethyl-P-toluidine, N,N'-dimethyl-aniline, N-methyl-diethanolamine, N-methyl-dimethanol amine, N,N'-dimethyl amino-acetophenone, N,N'-dimethyl aminobenzophenone, N,N'-diethyl-amino-benzophenone, and triisopropanolamine.

Styrene-based copolymers may be blended in the present invention for the purpose of adjusting the rubber physical property of the cured product. For example, the styrene-based copolymers include, but are not particularly limited to, styrene-butadiene copolymers, styrene-isoprene copolymers (SIP), styrene-butadiene copolymers (SB), styrene-ethylene-butylene-styrene copolymers (SEBS), styrene-isobutylene-styrene copolymers (SIBS), acrylonitrile-styrene copolymers (AS), styrene-butadiene-acrylonitrile copolymers (AB S), and the like.

For the purpose of improving e.g. the elastic modulus and the fluidity of the cured product, fillers may be added to the present invention to an extent that does not impair the storage stability. Specific examples thereof include organic powders, inorganic powders, metallic powders, and the like. Fillers of inorganic powder include glass, spherical silica, fumed silica, alumina, mica, ceramics, silicone rubber powders, calcium carbonate, aluminum nitride, carbon powders, kaolin clay, dried clay minerals, dried diatomaceous earth, silane compounds, and the like. The amount of inorganic powder blended is preferably about 0.1 to 100 parts by mass relative to 100 parts by mass of the ingredient (A). When the amount is more than 0.1 parts by mass, the effect will not be reduced. When the amount is 100 parts by mass or less, it is possible to obtain sufficient fluidity of the curable resin composition and to obtain good workability.

Fumed silica can be blended for the purpose of adjusting the viscosity of the curable resin composition or improving the mechanical strength of the cured product. Preferably, it is possible to use ones hydrophobically treated with organochlorosilanes, polyorganosiloxane, hexamethyldisilazane, or the like. Specific examples of the fumed silica include, for example, commercially available products manufactured by Nippon Aerosil Co., Ltd, such as trade name Aerosil R 974, R 972, R 972 V, R 972 CF, R 805, R 812, R 812 S, R 816, R 8200, RY 200, RX 200, RY 200 S, and R 202.

Fillers of organic powder include, for example, polyethylene, polypropylene, nylon, cross-linked acrylic, cross-linked polystyrene, polyesters, polyvinyl alcohols, polyvinyl butyral, and polycarbonate. The amount of organic powder blended is preferably about 0.1 to 100 parts by mass relative to 100 parts by mass of the ingredient (A). When the amount is more than 0.1 parts by mass, the effect will not be reduced. When the amount is 100 parts by mass or less, it is possible to obtain sufficient fluidity of the curable resin composition and to obtain good workability.

Fillers of metallic powder include, for example, gold, platinum, silver, copper, indium, palladium, nickel, alumina, tin, iron, aluminum, stainless steel, and the like. The amount of metallic powder blended is preferably about 0.1 to 100 parts by mass and more preferably 1 to 50 parts by mass relative to 100 parts by mass of the ingredient (A).

The present invention may be added with preservation stabilizers. Examples of the preservation stabilizers which can be added include radical absorbers such as benzoquinone, hydroquinone, and hydroquinone monoethyl ether, metal chelating agents such as ethylenediaminetetraacetic acid or 2-sodium salts thereof, oxalic acid, acetylacetone, and o-aminophenol, and the like.

Antioxidants may be added to the present invention. The antioxidant include, for example, quinone-based compounds such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone; phenols such as phenothiazine, 2,2-methyl ene-bis(4-methyl-6-tert-butyl phenol), catechol, tert-butyl catechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3,5-di-tert-pentylphenyl) ethyl]-4,6-di-tert-pentylphenyl acrylate, 4,4'-butylidenebis(6-tert-butyl-3-methyl phenol), 4,4'-thiobis(6-tert-butyl-3-methyl phenol), 3,9-bis[2-[3-(3-tert-butyl-4-hydroxy-5-methylphenyl) propionyloxy]-1,1-dimethylethyl]-2,4,8,10-tetraoxaspiro [5,5] undecane, pentaerythritol tetrakis[3-(3,5-di-tert-butyl-4-hydroxyphenyl) propionate], thiodiethylene bis[3-(3,5-di-tert-butyl-4-hydroxyphenyl) propionate], octadecyl-3-(3,5-di-tert-butyl-4-hydroxyphenyl) propionate, N,N'-hexane-1,6-diylbis[3-(3,5-di-tert-butyl-4-hydroxyphenyl) propionamide], benzene propanoic acid, 3,5-bis(1,1-dimethylethyl)-4-hydroxy, $C_7$-$C_9$ side chain alkyl ester, 2,4-dimethyl-6-(1-methylpentadecyl) phenol, diethyl [[3,5-bis(1,1-dimethylethyl)-4-hydroxyphenyl] methyl] phosphonate, 3,3',3",5,5',5"-hexa-tert-butyl-a,a',a"-(mesitylene-2,4,6-tolyl) tri-p-cresol, calcium diethyl bis[[3,5-bis(1,1-dimethylethyl)-4-hydroxyphenyl] methyl] phosphonate, 4,6-bis(octylthiomethyl)-o-cresol, ethylenebis(oxyethylene) bis[3-(5-tert-butyl-4-hydroxy-m-tolyl) propionate], hexamethylenebis[3-(3,5-di-tert-butyl-4-hydroxyphenyl) propionate, 1,3,5-tris(3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl) methyl]-1,3,5-tri azine-2,4,6 (1H,3H, 5H)-trione, a reaction product of N-phenylbenzenamine and 2,4,6-trimethylpentene, 2,6-di-tert-butyl-4-(4,6-bis(octylthio)-1,3,5-triazine-2-ylamino) phenol, picric acid, and citric acid; phosphorus-based compounds such as tris(2,4-di-tert-butylphenyl)phosphite, tris[2-[[2,4,8,10-tetra-tert-butyldibenzo[d,f][1,3,2]dioxaphosphefin-6-yl]oxy]ethyl] amine, bis(2,4-di-tert-butylphenyl)pentaerythritol diphosphite, bis[2,4-bis(1,1-dimethylethyl)-6-methylphenyl] ethyl ester phosphorous acid, tetrakis(2,4-di-tert-butylphenyl)[1,1-bisphenyl]-4,4'-diylbisphosphonite, 6-[3-(3-tert-butyl-4-hydroxy-5-methylphenyl)propoxy]-2,4,8,10-tetra-tert-butyl dibenz[d,f][1,3,2]dioxaphosphefin; sulfur-based compounds such as dilauryl 3,3'-thiodipropionate, dimyristyl 3,3'-thiodipropionate, distearyl 3,3'-thiodipropionate, pentaerythrityl tetrakis(3-lauryl thiopropionate), and 2-mercaptobenzimidazole; amine-based compounds such as phenothiazine; lactone-based compounds; and vitamin E-based compounds. Among these, phenol-based compounds are preferable.

Light stabilizers may be added to the present invention. The light stabilizers include, for example, hindered amine types such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-buty-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinyl-methacrylate, bis(1,2,2,6,6-pentamethyl-4-piperidinyl)[[3, 5-bis(1,1-dimethylethyl)-4-hydroxyphenyl]methyl]butyl malonate, decanedioic acid bis(2,2,6,6-tetramethyl-1(octyloxy)-4-piperidinyl)ester, a reaction product of 1,1-dimethyl ethyl hydroperoxide and octane, N,N',N",N'''-tetrakis-(4,6-bis-(butyl-(N-methyl-2,2,6,6-tetramethylpiperidine-4-yl) amino)-triazine-2-yl)-4,7-diazadecane-1,10-diamine, a polycondensate of N-(2,2,6,6-tetramethyl-4-piperidyl) butylamine with dibutylamine-1,3,5-triazine-N,N'-bis(2,2,6, 6-tetramethyl-4-piperidyl-1,6-hexamethylene diamine, poly [[6-(1,1,3,3-tetramethylbutyl)amino-1,3,5-triazine-2,4-diyl] [(2,2,6,6-tetramethyl-4-piperidyl)imino]hexamethylene[(2, 2,6,6-tetramethyl-piperidyl-4-piperidyl)imino]], a polymer of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,20-diazadispiro [5,1,11,2] heneicosan-21-one, β-alanine, N,-(2,2,6,6-tetramethyl-4-piperidinyl)-dodecyl ester/tetradecyl ester, N-acetyl-3-dodecyl-1-(2,2,6, 6-tetramethyl-4-piperidinyl)pyrrolidine-2,5-dione, 2,2,4,4-tetramethyl-7-oxa-3,20-diazadispiro-[5,1,11,2]-heneicosan-21-one, 2,2,4,4-tetramethyl-21-oxa-3,20-diazacyclo-[5,1, 11,2]-heneicosan-20-propanoic acid dodecyl ester/ tetradecyl ester, propanedioic acid, [(4-methoxyphenyl)-methylene]-bis(1,2,2,6,6-pentamethyl-4-piperidinyl)ester, higher fatty acid esters of 2,2,6,6-tetramethyl-4-piperidinol, 1,3-benzenedicarboxamide, N,N'-bis(2,2,6,6-tetramethyl-4-piperidinyl); benzophenone-based compounds such as octabenzone; benzotriazole-based compounds such as 2-(2H-benzotriazole-2-yl)-4-(1,1,3,3-tetramnethylbutyl) phenol, 2-(2-hydroxy-5-methylphenyl)benzotriazole, 2-[2-hydroxy-3-(3,4,5,6-tetrahydrophthalimide-methyl)-5-methylphenyl]benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazole-2-yl)-5-tert-butyl-4-hydroxyphenyl)propionate and polyethylene glycol, 2-(2H-benzotriazole-2-yl)-6-dodecyl-4-methyl phenol; benzoate-based compounds such as 2,4-di-tert-butylphenyl-3,5-di-tert-butyl-4-hydroxybenzoate; and triazine-based compounds such as 2-(4,6-diphenyl-1,3,5-triazine-2-yl)-5-[(hexyl)oxy]phenol. Hindered amine-based compounds are particularly preferable.

Adhesion promoters may be added to the present invention. Examples of the adhesion promoters include 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, methacryloxyoctyl trimethoxysilane, vinyl trimethoxysilane, vinyl trichlorosilane, vinyl triethoxysilane, vinyltris(β-methoxyethoxy)silane, γ-chloropropyltrimethoxysilane, β-(3,4-epoxycyclohexyl) ethyltrimethoxysilane, γ-glycidoxypropyltrimethoxysilane, γ-mercaptoproropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, γ-ureidopropyltriethoxysilane, hydroxyethyl methacrylate phosphate ester, methacryloxyoxyethyl acid phosphate, methacryloxyoxyethyl acid phosphate monoethylamine half salt, 2-hydroxyethyl methacrylic acid phosphate, and the like. Preferable among these are hydroxyethyl methacrylate phosphate ester, meth acryl oxyoxyethyl acid phosphate, methacryloxyoxyethyl acid phosphate monoethylamine half salt, 2-hydroxyethyl methacrylic acid phosphate, and the like. The content of the adhesion promoter is preferably 0.05 to 30 parts by mass and further preferably 0.2 to 10 parts by mass relative to 100 parts by mass of the ingredient (A).

<Method of Producing Curable Resin Composition>

The curable resin composition of the present invention can be produced by a conventionally known method. It is possible to produce the curable resin composition by, for example, blending predetermined amounts of the ingredient (A) to the ingredient (E) as well as other optional ingredients, followed by mixing at a temperature of preferably 10 to 70° C. for preferably 0.1 to 5 hours, more preferably mixing at room temperature (25° C.±10° C.) for 0.5 to 2 hours using a mixing means such as a mixer. In addition, the production is suitably conducted preferably under a light-shielding environment (shielding active energy rays).

<Application Method>

As a method for applying the curable resin composition of the present invention to an adherend, a publicly known method for a sealing agent or an adhesive is used. For example, it is possible to use methods such as dispensing using an automatic coater, spraying, inkjet, screen printing, gravure printing, dipping, and spin coating. The curable resin composition of the present invention is preferably liquid at room temperature (25° C.±10° C.) from the viewpoint of easiness in application.

<Curing Method>

Consider the case of curing the curable resin composition of the present invention by irradiation with active energy rays and light such as ultraviolet rays and visible light. Examples of light sources and active energy ray sources include, but not particularly limited to, low pressure mercury lamps, medium pressure mercury lamps, high pressure mercury lamps, extra high pressure mercury lamps, black light lamps, microwave excited mercury lamps, metal halide lamps, sodium lamps, halogen lamps, xenon lamps, LEDs, fluorescent lamps, sunlight, and electron beam irradiation devices. The irradiation dose of irradiation with light and the like is preferably 10 kJ/m² or more and more preferably 15 kJ/m² or more from the viewpoint of the properties of the cured product. Note that the curing of the curable resin composition of the present invention does not require heating. Therefore, the curing by irradiation with active energy rays can be carried out not only under a high temperature condition up to about 100° C. but also at normal temperature (25° C.±10° C.).

<Cured Product>

A cured product of the present invention can be obtained by curing the curable resin composition of the present invention in the foregoing curing method by irradiation with active energy rays such as ultraviolet rays. A cured product of the present invention may be any product obtained by curing the curable resin composition of the present invention regardless of a curing method employed.

<Usage>

Since the curable resin composition of the present invention or the cured product thereof is a rubber elastic body being excellent in low gas permeability, low moisture permeability, heat resistance, acid resistance, and flexibility, specific usages of the sealing agents include stacked bodies for fuel cells, solar cells, dye-sensitized solar cells, lithium ion batteries, electrolytic capacitors, liquid crystal displays, organic EL displays, electronic paper, LEDs, hard disk devices, photodiodes, optical communication/circuits, electric wires/cables/optical fibers, optical isolators, IC cards, and the like; sensors; substrates; pharmaceutical and medical instruments and equipment; and the like. Among these usages, the usage as fuel cells is particularly preferable because the curable resin composition of the present invention rapidly cures by irradiation with active energy rays such as ultraviolet rays and is excellent in adhesion to an electrolyte membrane which is a hard-to-adhere material.

<Fuel Cell>

The fuel cell is a power generator that extracts electric power by chemically reacting hydrogen with oxygen. Here, as for fuel cells, there are four types including a solid polymer fuel cell, a phosphoric acid fuel cell, a molten carbonate fuel cell, and a solid oxide fuel cell. Among them, the solid polymer fuel cell achieves high power generation efficiency while having a relatively low operating temperature (around 80° C.), and therefore is used for applications such as power sources for automobiles, power generators for households, small power source for electronic equipment such as a mobile phone, and power sources for emergency.

Figure 2:
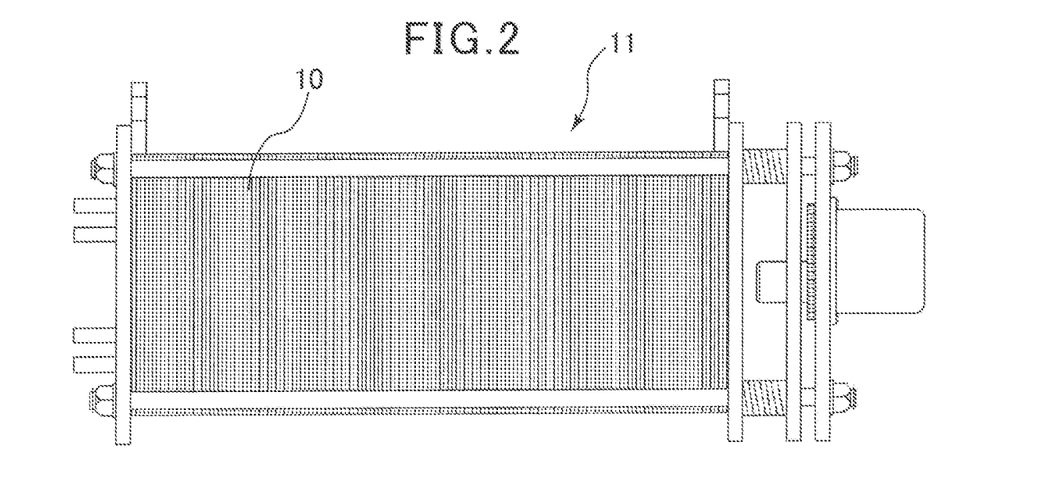
FIG. 2 is a schematic diagram illustrating the entire fuel cell.

As illustrated in FIG. 1, the cell 1 of the typical solid polymer fuel cell has the structure including: the electrolyte membrane electrode assembly 5 (MEA) structured such that the polymer electrolyte membrane 4 is nipped between the air electrode 3a and the fuel electrode 3b; the frame 6 supporting the MEA; and the separators 2 in which the gas flow paths are formed. In order to activate the solid polymer fuel cell, a fuel gas (hydrogen gas) and an oxidation gas (oxygen gas) are supplied through an oxidation gas flow path 8a and a fuel gas flow path 8b. Moreover, for the purpose of suppressing heat generation during power generation, cooling water flows through a cooling water flow path 9. Note that a package including several hundreds of such cells stacked on one another is referred to as a cell stack 10 as illustrated in FIG. 2.

When the fuel gas (hydrogen gas) is supplied to the fuel electrode and the oxidation gas (oxygen gas) is supplied to the air electrode (oxygen electrode), the following reactions occur at the respective electrodes, and a reaction to generate water (H$_2$+½O$_2$→H$_2$O) occurs as a whole. To be more specific, protons (H+) generated at the fuel electrode as described below are diffused inside the solid polymer membrane to move to the air electrode side, and water (H$_2$O) generated by reaction with the oxygen is discharged from the air electrode side.

Fuel electrode (anode electrode): H$_2$→2H$^+$+2e$^-$

Air electrode (cathode electrode): ½O$_2$+2H$^+$+2e$^-$
→H$_2$O

In order to activate the solid polymer fuel cell, it is necessary to supply the anode electrode with the fuel gas containing hydrogen and supply the cathode electrode with the oxidation gas containing oxygen in such a separated manner that these gases can be isolated from each other. This is because there is a risk of lowering the power generation efficiency, if one of the gases is mixed with the other gas due to insufficiency of the isolation. Against such a background, a sealing agent is used in many portions for the purpose of preventing leakage of the fuel gas, the oxygen gas, and the like. Specifically, the sealing agent is used between adjacent separators, between a separator and a frame, between a frame and an electrolyte membrane or MEA, and so on.

As the polymer electrolyte membrane, there is a cation exchange membrane having ion conductivity, and a preferable one is made of a fluorine-based polymer having a sulfonic acid group or the like, because it is chemically stable and has high resistance under high-temperature operation. There are commercially available products such as Nafion (registered trademark) manufactured by DuPont, Flemion (registered trademark) manufactured by Asahi Kasei Corporation, Aciplex (registered trademark) manufactured by Asahi Glass Co., Ltd., and the like. Although a polymer electrolyte membrane generally has properties difficult to bond, use of the curable resin composition of the present invention makes it possible to bond the polymer electrolyte membrane.

Nafion (Registered Trademark)

The fuel electrode is called a hydrogen electrode or an anode, and a known electrode is used as the fuel electrode. For example, an electrode in which carbon carries a catalyst such as platinum, nickel, or ruthenium is used. Meanwhile, the air electrode is called an oxygen electrode or a cathode, and a known electrode is used as the air electrode. For example, an electrode in which carbon carries a catalyst such as platinum or an alloy is used. The surface of each electrode may be provided with a gas diffusion layer which promotes the diffusion of gas and moisturization of the electrolyte membrane. As the gas diffusion layer, a known layer is used, and examples thereof include carbon paper, carbon cloth, carbon fiber, and the like.

As illustrated in FIG. 1, each of the separators 2 is provided with finely-ribbed flow paths, through each of which a fuel gas or an oxidizing gas is supplied to the corresponding electrode. The separator is made of aluminum, stainless steel, titanium, graphite, carbon, or the like.

The frame supports and reinforces an electrolyte membrane or MEA, which is a thin membrane, so as not to break the electrolyte membrane or MEA. As a material for the frame, there are thermoplastic resins such as polyvinyl chloride, polyethylene naphthalate, polyethylene terephthalate, polypropylene, and polycarbonate. In addition, in order to bond members using the curable resin composition of the present invention or a cured product thereof, it is preferable that the members allow passage of light and active energy rays.

The fuel cell of the present invention is characterized in that sealing is provided by the curable resin composition of the present invention or a cured product thereof. The members needed to be sealed in the fuel cell are the separators, the frame, the electrolyte membrane, the fuel electrode, the air electrode, the MEA, and so on. More specifically, sealing is provided between the adjacent separators, between the separator and the frame, between the frame and the electrolyte membrane or MEA, and the like. Here, the main purpose of "sealing between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path. Note that since the atmosphere becomes strongly acidic due to the acid generated from the electrolyte membrane, acid resistance is required for the sealing agent.

<Sealing Method>

A sealing method using the curable resin composition of the present invention is not particularly limited, and typical methods are FIPG (Form-in-Place Gasket), CIPG (Cure-in-Place Gasket), MIPG (Mold-in-Place Gasket), liquid injection molding, and the like.

FIPG is an adhesive sealing method involving: applying the curable resin composition of the present invention to a flange of a seal target component by an automatic coater or the like; and curing the curable resin composition, with the flange stuck on another flange, by irradiation with active energy rays such as ultraviolet rays from the transmissive flange side. More specifically, the method is a method for sealing at least part of at least two flanges of seal target components including the at least two flanges, at least one of which is a flange allowing active energy rays to pass therethrough, the method comprising the steps of: applying the curable resin composition described above to a surface of at least one of the flanges; sticking the one flange with the curable resin composition applied thereto onto the other flange with the curable resin composition interposed in between; and sealing the at least part of the at least two flanges by curing the curable resin composition by irradiation with active energy rays through the transmissive flange.

CIPG is a method involving: applying the curable resin composition of the present invention in the form of a bead to a flange of a seal target component by an automatic coater or the like; forming a gasket by curing the curable resin composition by irradiation with active energy rays such as ultraviolet rays; and performing compression sealing with the flange stuck on another flange. More specifically, the method is a method for sealing at least part of at least two flanges of seal target components including the at least two flanges, comprising the steps of: applying the curable resin composition described above at least one of the flanges; irradiating the applied curable resin composition with active energy rays to cure the curable resin composition, thereby forming a gasket composed of a cured product of the curable resin composition; placing the other flange on the gasket, and sealing the at least part of the at least two flanges in such a way that the other flange and the one flange with the curable resin composition applied thereto are pressure bonded together with the gasket interposed in between.

MIPG is a method involving: placing a mold in pressure contact with a flange of a seal target component in advance; forming a gasket by injecting the curable resin composition into a cavity formed between the mold made of a material allowing passage of active energy rays and the flange, and by irradiation with the active energy rays such as ultraviolet rays followed by curing; and performing compression sealing with the flange stuck on the other flange. Here, the mold is preferably made of a material allowing passage of active energy rays, which is specifically glass, polymethylmethacrylate (PMMA), polycarbonate, cycloolefin polymer, olefin, or the like. In addition, for easy demolding of the gasket from the mold after the formation of the gasket, it is preferable to apply a release agent such as a fluorine-based agent or a silicone-based agent. More specifically, the method is a method for sealing at least part of at least two flanges of seal target components including the at least two flanges, comprising the steps of: placing a gasket formation mold on at least one of the flanges; injecting the curable resin composition described above into at least part of a cavity formed between the gasket formation mold and the flange on which the mold is placed; irradiating the curable resin composition with the active energy rays to cure the curable resin composition, thereby forming a gasket composed of a cured product of the curable resin composition; detaching the mold from the one flange; and sealing the at least part of the at least two flanges by placing the other flange on the gasket and then pressure bonding the one and the other flanges together with the gasket interposed in between.

The liquid injection molding is a method involving: forming a gasket by injecting the curable resin composition of the present invention with a predetermined pressure into a mold made of a material allowing passage of active energy rays, and curing the curable resin composition by irradiation with active energy rays such as ultraviolet rays; and performing compression sealing with the flange stuck on the other flange. Here, the mold is preferably made of a material allowing passage of active energy rays, which is specifically glass, PMMA, polycarbonate, cycloolefin polymer, olefin, or the like. In addition, for easy demolding of the gasket from the mold after the formation of the gasket, it is preferable to apply a release agent such as a fluorine-based agent, a silicone-based agent, or the like.

EXAMPLES

Hereinafter, the present invention will be described in further details by taking Examples, but the present invention should not be limited to these Examples.
<Preparation of Curable Resin Composition>

Each of the ingredients was sampled in parts by mass shown in Table 1a and Table 1b, and mixed in a planetary mixer for 60 minutes at normal temperature (18° C.) in an environment where active energy rays were shielded to prepare a curable resin composition. Measurement was carried out for the physical properties as follows.

Note that the detailed amounts prepared are in accordance with Table 1a and Table 1b, and all numerical values are expressed in parts by mass.
<Production of a1>

Production of Polyisobutylene Polymer Having Acryloyloxyethoxyphenyl Groups (a1)

After replacing the inside of a 5 L separable flask with nitrogen, 200 mL of n-hexane and 2000 mL of butyl chloride were added, and the mixture was cooled to −70° C. with stirring under a nitrogen atmosphere. Subsequently, 840 mL (9 mol) of isobutylene, 12 g (0.05 mol) of p-dicumyl chloride, and 1.1 g (0.012 mol) of 2-methylpyridine were added. After the reaction mixture was cooled to −70° C., 5.0 mL (0.05 mol) of titanium tetrachloride was added to initiate polymerization. Three hours after the initiation of polymerization, 40 g of phenoxyethyl acrylate (Light Acrylate PO-A, manufactured by Kyoeisha Chemical Co., Ltd.) and 110 ml of titanium tetrachloride were added. After that, stirring was continued at −70° ° C. for 4 hours, and then 1000 ml of methanol was added to stop the reaction. The supernatant was separated from the reaction solution, and the solvent and the like were distilled off. Then, the product was dissolved in 3000 ml of n-hexane, washed three times with 3000 ml of pure water, and reprecipitated from methanol. After that, the solvent was distilled off under reduced pressure, and the obtained polymer was vacuum-dried at 80° C. for 24 hours to obtain a polyisobutylene polymer having acryloyloxyethoxyphenyl groups (a).

The a1 contains the —[CH$_2$C(CH$_3$)$_2$]— unit and contains two acryloyl groups. More specifically, a1 is a polyisobutylene polymer where, in general formula (1), R$^1$ represents a phenylene group, PIB represents a polyisobutylene backbone, R$^4$ represents a hydrocarbon group having two carbon atoms, R$^2$ and R$^3$ each independently represent a hydrogen atom, R$^5$ represents a hydrogen atom, and n is 2, and specifically a polymer represented by the following general formula (3). Note that the number average molecular weight of the ingredient a1 (chromatographic method, in terms of polystyrene) was 11,100, and the viscosity (25° C.) of the ingredient a1 measured in accordance with JIS K 7117 using a cone plate type viscometer was 1550 Pa·s.

(3)

<Ingredient (B)>
b1: 2-hydroxy-2-methyl-1-phenyl-propan-1-one (IRGACURE 1173, manufactured by BASF)
b2: bis(2,4,6-trimethylbenzoyl)-phenylphosphine oxide (IRGACURE 819, manufactured by BASF)
<Ingredient (C)>
c1: triphenylphosphine (reagent, manufactured by Tokyo Chemical Industry Co., Ltd.)
<Ingredient (D)>
d1: xanthone (reagent, manufactured by Tokyo Chemical Industry Co., Ltd.)
<Sensitizer Other Than Ingredient (C) or Ingredient (D)>
  2-ethylanthraquinone (reagent, manufactured by Junsei Chemical Co., Ltd.)
  9-fluorenone (reagent, manufactured by Junsei Chemical Co., Ltd.)
  benzophenone (reagent, manufactured by Junsei Chemical Co., Ltd.)
<Ingredient (E)>
e1: isobornyl methacrylate (SR 423, manufactured by Sartomer)
e2: dicyclopentanyl methacrylate (FA-513M, manufactured by Hitachi Chemical Co., Ltd.)

The test methods used in Examples and Comparative Examples in Table 1a and Table 1b are as follows.
<Evaluation of Surface Curability by Irradiation with Active Energy Ray>

Each of the compositions of Examples and Comparative Examples was applied on a glass plate of 10 mm×10 mm to have a thickness of 500 μm. Next, curing was performed by irradiation with ultraviolet rays for 20 seconds using an ultraviolet ray irradiator to obtain an accumulated light amount of 45 kJ/m$^2$. Thereafter, the cured product was evaluated based on the following criteria in a contact test with a fluororesin rod (cylinder made of PTFE and having an outer diameter of 5 mmφ, a length of 100 mm, and a contact area of 9 mm²).
[Evaluation Criteria]
Favorable: The cured product does not adhere to the fluororesin rod and is not lifted
Unfavorable: The cured product adheres to the fluororesin rod. Alternatively, the cured product does not adhere to the fluororesin rod but is temporarily lifted
<Evaluation of Deep Curability by Irradiation with Active Energy Ray>

A cured product was obtained as follows. Each curable resin composition was placed in a metal cylinder (made of stainless steel and having a diameter of 3 mmφ and a height of 8 mm) having a depth of 5 mm and cured by irradiation with ultraviolet rays for 20 seconds using an ultraviolet ray irradiator to obtain an accumulated light amount of 45 kJ/m². Then, the uncured portion was removed with a solvent (type: toluene), and the thickness of the cured portion was measured with a caliper. In this way, the deep curability was calculated. The results are summarized in Table 1a and Table 1b. Note that, for application to curable sealing agent for a fuel cells, deep curability of 1 mm or more is preferable from the viewpoint of effectiveness for different material adhesion.
[Evaluation Criteria]
Favorable: The deep curability is 1 mm or more
Unfavorable: The deep curability is less than 1 mm TABLE 1a

| Ingredient | | Example 1 | Example 2 | Example 3 | Example 4 | Example 5 | Example 6 |
|---|---|---|---|---|---|---|---|
| Ingredient (A) | a1 | 100 | 100 | 100 | 100 | 100 | 100 |
| Ingredient (B) | b1 | 4 | 4 | 4 | 4 | | |
| | b2 | | | | | 4 | 4 |
| Ingredient (C) | c1 | 0.5 | 1 | 2 | 2 | 1 | 1 |
| Ingredient (D) | d1 | 1 | 2 | 2 | 4 | 2 | 2 |
| Ingredient (E) | e1 | 50 | 50 | 50 | 50 | 50 | |
| | e2 | | | | | | 50 |
| Surface Curability | | Favorable | Favorable | Favorable | Favorable | Favorable | Favorable |
| Deep Curability | | Favorable | Favorable | Favorable | Favorable | Favorable | Favorable |

TABLE 1b

| Ingredient | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Ingredient (A) | a1 | 100 | 100 | 100 | 100 | 100 | 100 | 100 | 100 | 100 |
| Ingredient (B) | b1 | 4 | 4 | 4 | 4 | 4 | 4 | 4 | 4 | 4 |
| Ingredient (C) | c1 | 2 | 4 | | 2 | 2 | 2 | | | |
| Ingredient (D) | d1 | | | 2 | | | | 2 | 2 | 2 |
| Comparison | 2-Ethylanthraquinone | | | | 2 | | | 2 | | |
| | 9-Fluorenone | | | | | 2 | | | 2 | |
| | Benzophenone | | | | | | 2 | | | 2 |
| Ingredient (E) | e1 | 50 | 50 | 50 | 50 | 50 | 50 | 50 | 50 | 50 |
| Surface Curability | | Unfavorable | Unfavorable | Unfavorable | Unfavorable | Unfavorable | Favorable | Unfavorable | Unfavorable | Favorable |
| Deep Curability | | Favorable | Favorable | Favorable | Favorable | Favorable | Unfavorable | Favorable | Favorable | Unfavorable |

Example 3, which is a composition not containing the ingredient (C) of the present invention, is inferior in surface curability. Additionally, it is understood that Comparative Examples 4 and 5, which are compositions employing 2-ethylanthraquinone and 9-fluorenone instead of the ingredient (D) of the present invention, are inferior in surface curability. It is understood that Comparative Example 6, which is a composition employing benzophenone instead of the ingredient (D) of the present invention, is inferior in deep curability. Additionally, it is understood that Comparative Examples 7 and 8, which are compositions employing 2-ethylanthraquinone and 9-fluorenone instead of the ingredient (C) of the present invention, are inferior in surface curability. It is understood that Comparative Example 9, which is a composition employing benzophenone instead of the ingredient (C) of the present invention, is inferior in deep curability.

Moreover, tests for moisture permeability (water vapor barrier property) and hydrogen gas barrier property were carried out. Comparative Examples 10 and 11 used the compositions prepared as follows.

Comparative Example 10

Comparative Example 10 was obtained by the same preparation as that of Example 3 except that, in Example 3, the ingredient (A) was changed to a urethane dimethacrylate having a polybutadiene backbone (TE-2000, manufactured by Nippon Soda Co., Ltd.).

Comparative Example 11

Comparative Example 11 was obtained by the same preparation as that of Example 3 except that, in Example 3, Examples 1 to 6 of Table 1a show that the present invention is excellent in surface curability and deep curability by irradiation with active energy rays such as ultraviolet rays.

In addition, it is understood that Comparative Examples 1 and 2 of Table 1b, which are compositions not containing the ingredient (D) of the present invention, are inferior in surface curability. It is understood that Comparative the ingredient (A) was changed to a urethane dimethacrylate having a polyether backbone (UXF-4002, manufactured by Nippon Kayaku Co., Ltd.).

<Moisture Permeability (Water Vapor Barrier Property)>

Each of the curable resin compositions of Examples 3 and 6 and Comparative Examples 10 and 11 was poured into a frame of 200 mm×200 mm×1.0 mm. Then, a sheet-shaped cured product having a thickness of 1.0 mm was prepared by irradiation with ultraviolet rays for 20 seconds using an ultraviolet ray irradiator to obtain an accumulated light amount of 45 kJ/m$^2$. In an aluminum cup having an opening with a diameter of 30 mm, 5 g of calcium chloride (anhydrous) was placed, and the cured product was set in the opening of the cup without gaps. After measuring the "initial total mass" (g), the cured product was allowed to stand for 24 hours in a thermo-hygrostat kept at an ambient temperature of 40° C. and a relative humidity of 95%. Thereafter, the "total mass after standing" (g) was measured, and the moisture permeability (g/m$^2$·24 h) was calculated. Evaluation was carried out based on the following evaluation criteria. The results are shown in Table 2. The detailed test method is in accordance with JIS Z 0208. Note that the moisture permeability is preferably less than 50 g/m$^2$ 24 h in the case of use as a curable sealing agent for a fuel cell.

[Evaluation Criteria]

Favorable: The moisture permeability is less than 10 g % m$^2$·24 h good: The moisture permeability is 10 g/m$^2$·24 h or more and less than 50 g/m$^2$·24

Unfavorable: The moisture permeability is 50 g/m$^2$·24 h or more

<Hydrogen Gas Barrier Property>

Each of the curable resin compositions of Examples 3 and 6 and Comparative Examples 10 and 11 was used to prepare a sheet-shaped cured product having a thickness of 1.0 mm by irradiation with ultraviolet rays for 20 seconds using an ultraviolet ray irradiator to obtain an accumulated light amount of 45 kJ/m$^2$. Next, the sheet-shaped cured product was used to measure the permeability of hydrogen gas in accordance with JIS K 7126-1: 2006 (Plastic-Film and Sheet-Gas Permeability Test Method—Part 1: Differential Pressure Method). Note that the test type was the pressure sensor method, and the measurement was conducted under the conditions of 23° C. and the high pressure side test gas (hydrogen gas) having 100 kPa. Evaluation was carried out based on the following evaluation criteria. The results are shown in Table 2. Note that the hydrogen gas barrier property is preferably less than 1×10$^{-15}$ mol·m/m$^2$·s·Pa in the case of use as a curable sealing agent for a fuel cell.

[Evaluation Criteria]

Favorable: less than 1×10$^{-15}$ mol·m/m$^2$·s·Pa

Unfavorable: 1×10$^{-15}$ mol·m/m$^2$·s·Pa or more

TABLE 2

|  | Example 3 | Example 6 | Comparative Example 10 | Comparative Example 11 |
| --- | --- | --- | --- | --- |
| Moisture Permeability | Favorable | Favorable | Good | Unfavorable |
| Hydrogen Gas Barrier Property | Favorable | Favorable | Unfavorable | Unfavorable |

Examples 3 and 6 of Table 2 show that the present invention is low in moisture permeability and excellent in hydrogen gas barrier property, and has good sealability. On the other hand, the results for Comparative Example 10, which was a urethane dimethacrylate having a polybutadiene backbone used instead of the ingredient (A), were such that the moisture permeability and the hydrogen gas barrier property were inferior. In addition, the results for Comparative Example 11, which was a urethane dimethacrylate having a polyether backbone used instead of the ingredient (A), were such that the hydrogen gas barrier property was inferior.

INDUSTRIAL APPLICABILITY

The present invention is excellent in surface curability and deep curability by irradiation with active energy rays such as ultraviolet rays while maintaining sealability, and therefore can be used for various sealing applications. The present invention is industrially useful because it is effective particularly as a curable sealing agent for a fuel cell.

REFERENCE SIGNS LIST 1 cell of solid polymer fuel cell
2 separator
3a air electrode (cathode)
3b fuel electrode (anode)
4 polymer electrolyte membrane
5 electrolyte membrane electrode assembly (MEA)
6 frame
7 adhesive or sealing agent
8a oxidizing gas flow path
8b fuel gas flow path
9 cooling water flow path
10 cell stack
11 solid polymer fuel cell

What is claimed is:

1. A curable resin composition comprising the following ingredients (A) to (D):
   ingredient (A): a polymer which has one or more (meth) acryloyl groups and has a polyisobutylene backbone containing a —[CH$_2$C(CH$_3$)$_2$]— unit,
   ingredient (B): a radical polymerization initiator,
   ingredient (C): a compound selected from the group consisting of a triarylphosphine, tris(o-tolyl)phosphine, tris(p-tolyl)phosphine, and tris(m-tolyl)phosphine, and
   ingredient (D): a compound selected from the group consisting of xanthone, 3-hydroxyxanthone, and diethoxyxanthone,
   wherein the mass ratio of the ingredient (B) and the ingredient (D) is 5:1 to 1:5, and the mass ratio of the ingredient (C) and the ingredient (D) is 5:1 to 1:5.

2. The curable resin composition according to claim 1, wherein
   the ingredient (A) is a polymer having a polyisobutylene backbone represented by general formula (1):

where R$^1$ represents a monovalent or polyvalent aromatic hydrocarbon group, or a monovalent or polyvalent aliphatic hydrocarbon group, PIB represents the polyisobutylene backbone containing the —[CH$_2$C(CH$_3$)$_2$]— unit, R$^4$ represents a divalent hydrocarbon group having 2 to 6 carbon atoms and optionally containing an oxygen atom, $R^2$ and $R^3$ each independently represent a hydrogen atom or a monovalent hydrocarbon group having 1 to 20 carbon atoms, $R^5$ represents a hydrogen atom, a methyl group, or an ethyl group, and n is an integer from 1 to 6.

3. The curable resin composition according to claim 1, further comprising a (meth)acrylate monomer as an ingredient (E).

4. The curable resin composition according to claim 3, wherein
the ingredient (E) is a (meth)acrylate monomer which has an alkyl group having 5 to 30 carbon atoms or an alicyclic group having 5 to 30 carbon atoms.

5. The curable resin composition according to claim 1, wherein
the ingredient (C) is contained at 0.1 to 30 parts by mass and the ingredient (D) is contained at 0.1 to 30 parts by mass relative to 100 parts by mass of the ingredient (A).

6. A curable sealing agent for a fuel cell comprising the curable resin composition according to claim 1.

7. The curable sealing agent for a fuel cell according to claim 6, wherein
the curable sealing agent for a fuel cell is a sealing agent for a periphery of any member selected from the group consisting of separators, frames, electrolytes, fuel electrodes, air electrodes, and electrolyte membrane electrode assemblies, which are members in a fuel cell.

8. The curable sealing agent for a fuel cell according to claim 6, wherein
the sealing agent is a sealing agent between adjacent separators in a fuel cell or a sealing agent between a frame and an electrolyte membrane or an electrolyte membrane electrode assembly in the fuel cell.

9. The curable sealing agent for a fuel cell according to claim 6, wherein
the fuel cell is a solid polymer fuel cell.

10. A cured product which is formed by curing the curable resin composition according to claim 1 or the sealing agent comprising the curable resin composition.

11. A fuel cell comprising any seal selected from the group consisting of seals between adjacent separators in the fuel cell and seals between a frame and an electrolyte membrane or an electrolyte membrane electrode assembly in the fuel cell, wherein
the any seal contains the cured product according to claim 10.

12. The fuel cell according to claim 11, wherein
the fuel cell is a solid polymer fuel cell.

13. A method for sealing at least part of at least two flanges of seal target components including the at least two flanges, at least one of which is a flange allowing active energy rays to pass therethrough, the method comprising the steps of:
applying the curable resin composition according to claim 1 to a surface of at least one of the flanges;
sticking the one flange with the curable resin composition applied thereto onto the other flange with the curable resin composition interposed in between; and
sealing the at least part of the at least two flanges by curing the curable resin composition by irradiation with active energy rays through the transmissive flange.

14. A method for sealing at least part of at least two flanges of seal target components including the at least two flanges, comprising the steps of:
applying the curable resin composition according to claim 1 to at least one of the flanges;
irradiating the applied curable resin composition with active energy rays to cure the curable resin composition, thereby forming a gasket composed of a cured product of the curable resin composition;
placing the other flange on the gasket, and sealing the at least part of the at least two flanges in such a way that the other flange and the one flange with the curable resin composition applied thereto are pressure bonded together with the gasket interposed in between.

15. A method for sealing at least part of at least two flanges of seal target components including the at least two flanges, comprising the steps of:
placing a gasket formation mold on at least one of the flanges;
injecting the curable resin composition according to claim 1 into at least part of a cavity formed between the gasket formation mold and the flange on which the mold is placed;
irradiating the curable resin composition with the active energy rays to cure the curable resin composition, thereby forming a gasket composed of a cured product of the curable resin composition;
detaching the mold from the one flange; and
sealing the at least part of the at least two flanges by placing the other flange on the gasket and then pressure bonding the one and the other flanges together with the gasket interposed in between.

16. The curable resin composition according to claim 1, wherein
the ingredient (B) is an acetophenone-based radical polymerization initiator or an acylphosphine oxide-based radical polymerization initiator.

17. The curable resin composition according to claim 1, wherein
the ingredient (C) is a triarylphosphine, and
the ingredient (D) is xanthone.

18. The curable resin composition according to claim 1, wherein the mass ratio of the ingredient (B) and the ingredient (C) ((B):(C)) is 8:1 to 1:8.

* * * * *